United States Patent
Fujito (10) Patent No.: US 9,435,269 B2
(45) Date of Patent: Sep. 6, 2016

(54) VEHICLE AND INTAKE AMOUNT CONTROL DEVICE

(71) Applicant: YAMAHA HATSUDOKI KABUSHIKI KAISHA, Iwata-shi, Shizuoka (JP)

(72) Inventor: Manabu Fujito, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 83 days.

(21) Appl. No.: 14/377,543

(22) PCT Filed: Jan. 18, 2013

(86) PCT No.: PCT/JP2013/000234
§ 371 (c)(1),
(2) Date: Aug. 8, 2014

(87) PCT Pub. No.: WO2013/118431
PCT Pub. Date: Aug. 15, 2013

(65) Prior Publication Data
US 2015/0032355 A1    Jan. 29, 2015

(30) Foreign Application Priority Data
Feb. 10, 2012   (JP) ................. 2012-026821

(51) Int. Cl.
*F02D 9/02*    (2006.01)
*F02D 41/00*    (2006.01)
(Continued)

(52) U.S. Cl.
CPC .............. *F02D 9/02* (2013.01); *F02D 11/105* (2013.01); *F02D 41/0005* (2013.01);
(Continued)

(58) Field of Classification Search
CPC ..... F02D 11/10; B60W 10/11; B60W 10/06; B60T 8/175; B60K 6/445

USPC ................ 701/59, 60, 70, 93; 180/179, 197, 180/65.23, 65.25; 477/107, 108, 109, 110, 477/111
See application file for complete search history.

(56) References Cited

U.S. PATENT DOCUMENTS 5,058,022 A    10/1991   Kita et al.
6,405,587 B1    6/2002   Livshiz et al.
(Continued)

FOREIGN PATENT DOCUMENTS

DE          102 32 362 A1    1/2004
DE    10 2010 003 951 A1    10/2011
(Continued)

OTHER PUBLICATIONS

Official Communication issued in corresponding European Patent Application No. 13747083.7, mailed on Nov. 17, 2015.
(Continued)

*Primary Examiner* — Thomas G Black
*Assistant Examiner* — Wae Louie
(74) *Attorney, Agent, or Firm* — Keating & Bennett, LLP (57) ABSTRACT

In a vehicle, a CPU of an ECU calculates a rotation speed of an engine based on an assumption that a clutch is in a connected state based on a speed of a vehicle detected by a vehicle speed sensor as a hypothetical engine rotation speed. Subsequently, the CPU acquires a target degree of opening of a throttle valve based on the calculated hypothetical engine rotation speed and a set target engine torque. Then, the CPU controls a throttle drive device such that an actual degree of opening of the throttle valve is the acquired degree of opening.

15 Claims, 7 Drawing Sheets

(51) Int. Cl.
*F02D 11/10* (2006.01)
*F02D 41/02* (2006.01)
*F02D 41/22* (2006.01)

(52) U.S. Cl.
CPC .......... *F02D 41/023* (2013.01); *F02D 41/022* (2013.01); *F02D 41/222* (2013.01); *F02D 2009/0201* (2013.01); *F02D 2009/0213* (2013.01); *F02D 2009/0235* (2013.01); *F02D 2041/228* (2013.01); *F02D 2200/101* (2013.01); *F02D 2200/501* (2013.01); *F02D 2200/602* (2013.01); *F02D 2250/18* (2013.01); *Y02T 10/42* (2013.01)

(56) References Cited

U.S. PATENT DOCUMENTS

| | | | | |
|---|---|---|---|---|
| 2006/0287798 | A1* | 12/2006 | Inoue | B60L 15/2072 701/70 |
| 2007/0060444 | A1 | 3/2007 | Kawamura et al. | |
| 2008/0312035 | A1* | 12/2008 | Murayama | B60W 30/19 477/110 |
| 2009/0005943 | A1* | 1/2009 | Oshima | F02D 11/105 701/62 |
| 2013/0090828 | A1 | 4/2013 | Lemejda | |
| 2015/0032355 | A1* | 1/2015 | Fujito | F02D 11/105 701/99 |

FOREIGN PATENT DOCUMENTS

| | | |
|---|---|---|
| JP | 58-200052 A | 11/1983 |
| JP | 60-224949 A | 11/1985 |
| JP | 01-277660 A | 11/1989 |
| JP | 2-173333 A | 7/1990 |
| JP | 02-110240 U | 9/1990 |
| JP | 2005-098281 A | 4/2005 |
| JP | 2006-046300 A | 2/2006 |

OTHER PUBLICATIONS

Official Communication issued in International Patent Application No. PCT/JP2013/000234, mailed on Apr. 16, 2013.

\* cited by examiner

VEHICLE AND INTAKE AMOUNT CONTROL DEVICE

BACKGROUND OF THE INVENTION

1. Field of the Invention

The present invention relates to a vehicle and an intake amount control device.

2. Description of the Related Art

In a vehicle such as a motorcycle, when a travelling speed of the vehicle decreases due to gear shifting and the like, a travelling feeling of a rider may deteriorate due to exertion of a large engine brake. Therefore, various methods of controlling the engine brake have been disclosed.

For example, in a back torque reduction device described in JP 2005-98281 A, a front wheel speed and a rear wheel speed are detected during the travelling of the vehicle, and air is supplied to downstream of a throttle valve in an intake passage through an air supply passage when the front wheel speed becomes higher than the rear wheel speed. Thus, the effect of the engine brake is reduced.

Further, in an engine brake control device described in JP 2006-46300 A, an occurrence of an engine brake force is detected based on an intake air pressure of the engine. An amount of air to be taken into the engine is controlled based on a rotation speed of the engine at the time of the occurrence of the engine brake force, wherein the magnitude of the engine brake force is adjusted.

SUMMARY OF THE INVENTION

During the travelling of the vehicle, rotation speed of a drive wheel (a rear wheel, for example) and the engine largely fluctuate at the time of the operation of a clutch by the rider. Therefore, when an intake amount of the engine is adjusted based on the rotation speed of the drive wheel or the engine as described in JP 2005-98281 A and JP 2006-46300 A, the magnitude of the engine brake fluctuates according to the operation of the clutch. Thus, the engine brake cannot be reliably controlled, so that the travelling feeling of the rider is not sufficiently improved.

Preferred embodiments of the present invention provide a vehicle and an intake amount control device that reliably controls an engine brake.

According to a preferred embodiment of the present invention, a vehicle includes a main body, an engine that generates a torque to move the main body, a driving wheel driven by the engine, a clutch configured to switch between a connected state in which the torque is transmitted between the engine and the drive wheel and a disconnected state in which the torque is not transmitted between the engine and the drive wheel, an intake amount adjustor configured to adjust an intake amount of the engine by changing a control parameter corresponding to the intake amount of the engine, a movement speed detector configured to detect a movement speed of the main body, and a controller programmed and configured to, during deceleration of the vehicle, calculate a rotation speed of the engine based on an assumption that the clutch is in the connected state based on the movement speed detected by the movement speed detector as a hypothetical engine rotation speed, to acquire a target value of a control parameter as a first value based on the calculated hypothetical engine rotation speed and a set target engine torque, and to set the control parameter of the intake amount adjustor to the first value.

In the vehicle, a torque to move the main body is generated by the engine. The torque generated by the engine is transmitted to the drive wheel when the clutch is in the connected state, wherein the drive wheel is driven. Thus, the main body is moved.

During the deceleration, the torque generated by the engine becomes smaller than the torque of the drive wheel due to inertia, wherein the engine brake brakes the drive wheel. In this case, the rotation speed of the engine, based on the assumption that the clutch is in the connected state, is calculated as the hypothetical engine rotation speed based on the movement speed detected by the movement speed detector. A target value of the control parameter is acquired as a first value, and the control parameter of the intake amount adjustor is set to the first value based on the calculated hypothetical engine rotation speed and the set target engine torque.

The hypothetical engine rotation speed is not affected by a state of the clutch. Therefore, the first value acquired based on the hypothetical engine rotation speed and the target engine torque does not largely fluctuate by the state of the clutch. Thus, the control parameter of the intake amount adjustor is set to the first value, so that the intake amount of the engine is reliably controlled. Because the magnitude of the engine brake depends on the intake amount of the engine, the engine brake is reliably controlled by the reliable control of the intake amount of the engine. As a result, the travelling feeling of the rider is improved.

The vehicle preferably further includes a gear ratio detector configured to detect a gear ratio between the engine and the drive wheel, wherein the controller is preferably programmed and configured to calculate the hypothetical engine rotation speed based on the movement speed detected by the movement speed detector, the gear ratio detected by the gear ratio detector, and a peripheral length of the drive wheel. In this case, the hypothetical engine rotation speed is easily and accurately calculated.

The controller is preferably programmed and configured to store in advance a relationship among the torque generated by the engine, the rotation speed of the engine, and the control parameter, and to acquire a value of the control parameter corresponding to the calculated hypothetical engine rotation speed and the set target engine torque as the first value based on the stored relationship. In this case, the first value is easily acquired based on the hypothetical engine rotation speed and the target engine torque.

The intake amount adjustor preferably includes at least one intake path that leads air to the engine and at least one valve provided in the at least one intake path, and the control parameter preferably includes a degree of opening of the at least one valve. In this case, because the degree of opening of the at least one valve is set to the first value that is acquired based on the hypothetical engine rotation speed and the target engine torque, the intake amount of the engine is reliably controlled. Thus, the engine brake is reliably controlled.

The at least one valve is preferably a throttle valve, and the degree of opening of the at least one valve is preferably a degree of opening of the throttle valve. In this case, because the degree of opening of the throttle valve is set to the first value that is acquired based on the hypothetical engine rotation speed and the target engine torque, the intake amount of the engine is reliably controlled. Thus, the engine brake is reliably controlled. Further, because the existing throttle valve is used, the configuration of the vehicle is prevented from being complicated.

The vehicle preferably further includes an operation element operated by a rider in order to adjust the control parameter corresponding to the intake amount of the engine, and an operation amount detector configured to detect an operation amount of the operation element by the rider, wherein the controller is preferably programmed and configured to acquire a value of the control parameter corresponding to the operation amount detected by the operation amount detector as a second value, to set the control parameter of the intake amount adjustor to the first value when the acquired second value is smaller than the acquired first value, and to set the control parameter of the intake amount adjustor to the second value when the acquired second value is not less than the acquired first value.

In this case, when the second value is smaller than the first value, the intake amount of the engine is controlled based on the hypothetical engine rotation speed and the target engine torque. On the other hand, when the second value is not less than the first value, the intake amount of the engine is controlled based on the operation amount of the operation element by the rider. Thus, the intake amount of the engine is appropriately controlled according to the operation of the operation element by the rider while the engine brake is prevented from being excessively exerted during the deceleration.

The controller is preferably programmed and configured to determine whether or not the operation amount detector is normal, and to set the control parameter of the intake amount adjustor to the first value when the operation amount detector is not normal.

In this case, in a state in which the operation amount detector is not normal, the intake amount of the engine is prevented from being controlled based on the detection result of the operation amount detector. Further, the control parameter of the intake amount adjustor is set to the first value, wherein the vehicle is automatically decelerated by the engine brake. Thus, the vehicle is prevented from making an unstable movement against the intention of the rider.

A plurality of values are preferably set in advance as the target engine torque, and the vehicle preferably further includes an engine torque switch that is operated by a rider in order to select one value of the plurality of values.

In this case, the magnitude of the target engine torque is selected based on the preference of the rider and the driving conditions. Thus, the magnitude of the engine brake is adjusted according to the preference of the rider and the driving conditions.

The vehicle preferably further includes a roll angle detector configured to detect a roll angle of the main body, wherein the controller is preferably programmed and configured to correct the set target engine torque based on the roll angle detected by the roll angle detector, and to acquire the first value based on the corrected target engine torque.

In this case, the target engine torque is appropriately corrected based on the roll angle of the main body, wherein the magnitude of the engine brake is controlled to be an appropriate magnitude according to the travelling conditions.

The vehicle preferably further includes a steering angle detector configured to detect a steering angle defined by a moving direction of the main body with respect to a front-to-rear direction of the main body, wherein the controller is preferably programmed and configured to correct the set target engine torque based on the steering angle detected by the steering angle detector and to acquire the first value based on the corrected target engine torque.

In this case, the target engine torque is appropriately corrected based on the steering angle, wherein the magnitude of the engine brake is controlled to be an appropriate magnitude for the travelling conditions.

The vehicle preferably further includes a friction coefficient acquirer configured to acquire a friction coefficient between the drive wheel and a ground surface, wherein the controller is preferably programmed and configured to correct the set target engine torque based on the friction coefficient acquired by the friction coefficient acquirer and to acquire the first value based on the corrected target engine torque.

In this case, the target engine torque is appropriately corrected based on the friction coefficient between the drive wheel and the ground surface, wherein the magnitude of the engine brake is controlled to be an appropriate magnitude for the travelling conditions.

The vehicle preferably further includes a plurality of wheels that include at least the drive wheel, wherein the movement speed detector is preferably configured to detect the movement speed of the main body based on a rotation speed of at least one wheel of the plurality of wheels. In this case, the movement speed of the main body is detected with a simple configuration.

The plurality of wheels preferably include a non-drive wheel that is not driven by the engine, and the movement speed detector is preferably configured to detect the movement speed of the main body based on a rotation speed of the non-drive wheel. In this case, engine braking does not occur on the non-drive wheel. Thus, the sliding between the non-drive wheel and the ground surface is unlikely to occur. Therefore, the movement speed of the main body is more accurately detected based on the rotation speed of the non-drive wheel.

The plurality of wheels preferably include a front wheel and a rear wheel, and the movement speed detector is preferably configured to detect the movement speed of the main body based on a rotation speed of the front wheel. In this case, a load such as the main body is added to the front wheel during the deceleration. Thus, adhesion between the front wheel and the ground surface increases. Thus, the sliding is unlikely to occur between the front wheel and the ground surface. Therefore, the movement speed of the main body is more accurately detected based on the rotation speed of the front wheel.

According to another preferred embodiment of the present invention, an intake amount control device configured to control an intake amount of the engine is provided on a vehicle including the engine, a clutch, and an intake amount adjustor, and the intake amount adjustor is configured to adjust an intake amount of the engine by changing a control parameter corresponding to the intake amount of the engine. The intake amount control device includes a movement speed detector configured to detect a movement speed of the vehicle, and a controller programmed and configured to, during deceleration of the vehicle, calculate a rotation speed of the engine based on an assumption that the clutch is in a connected state based on the movement speed detected by the movement speed detector as a hypothetical engine rotation speed, to acquire a target value of a control parameter as a first value based on the calculated hypothetical engine rotation speed and a set target engine torque, and to set a control parameter of the intake amount adjustor to the first value.

In the intake amount control device, the rotation speed of the engine based on the assumption that clutch is in the connected state is calculated as the hypothetical engine rotation speed based on the movement speed detected by the movement speed detector. The value of the target control parameter is acquired as the first value based on the calculated hypothetical engine rotation speed and the set target engine torque, and the control parameter of the intake amount adjustor is set to the first value.

The hypothetical engine rotation speed is not affected by the state of the clutch. Therefore, the first value acquired based on the hypothetical engine rotation speed and the target engine torque does not largely fluctuate due to the state of the clutch. Thus, the control parameter of the intake amount adjustor is set to the first value, so that the intake amount of the engine is reliably controlled. Because the magnitude of the engine brake depends on the intake amount of the engine, the engine brake is reliably controlled by reliable control of the intake amount of the engine. As a result, the travelling feeling of the rider is improved.

The preferred embodiments of the present invention provide an engine brake that is reliably controlled.

The above and other elements, features, steps, characteristics and advantages of the present invention will become more apparent from the following detailed description of the preferred embodiments with reference to the attached drawings.

BRIEF DESCRIPTION OF THE DRAWINGS

FIGS. 5(a)-(d) is a timing chart for explaining a relationship among a vehicle speed, an actual engine rotation speed, a hypothetical engine rotation speed, and a gear ratio.

FIGS. 6(a)-(e) is a timing chart for explaining a relationship among the hypothetical engine rotation speed, a target engine torque, and a throttle opening.

DETAILED DESCRIPTION OF THE PREFERRED EMBODIMENTS

Hereinafter, a motorcycle will be described as one example of a vehicle according to preferred embodiments of the present invention with reference to the drawings.

Figure 1:
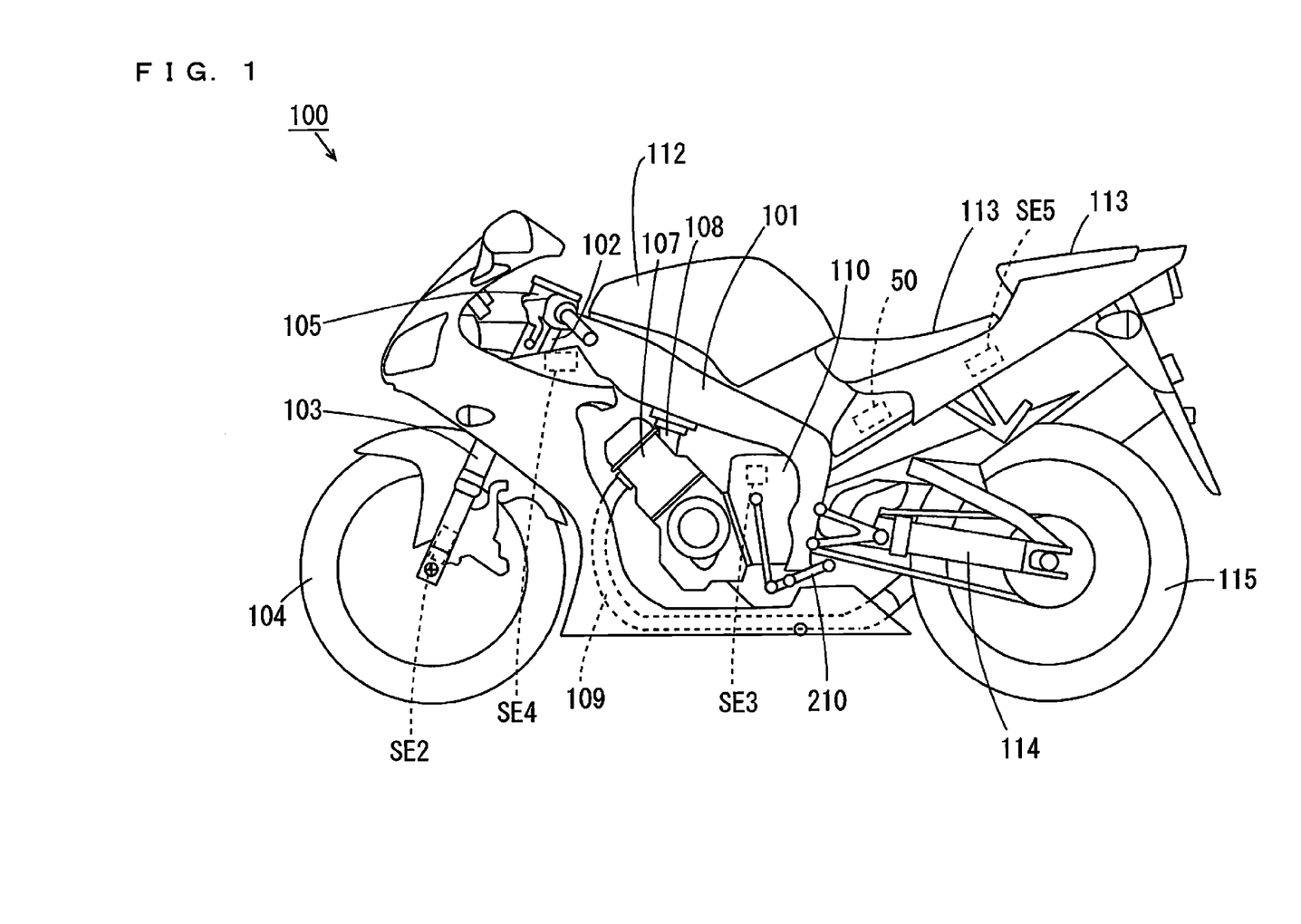
FIG. 1 is a schematic side view showing a motorcycle according to a preferred embodiment of the present preferred embodiment.

FIG. 1 is a schematic side view showing a motorcycle according to the present preferred embodiment. In the motorcycle 100 of FIG. 1, a head pipe 102 is provided at the front end of a body frame 101. A front fork 103 is provided at the head pipe 102 to be swingable to the left and right. A front wheel 104 is attached to the lower end of the front fork 103 so as to be rotatable. A handle 105 is provided at the upper end of the head pipe 102.

Figure 2:
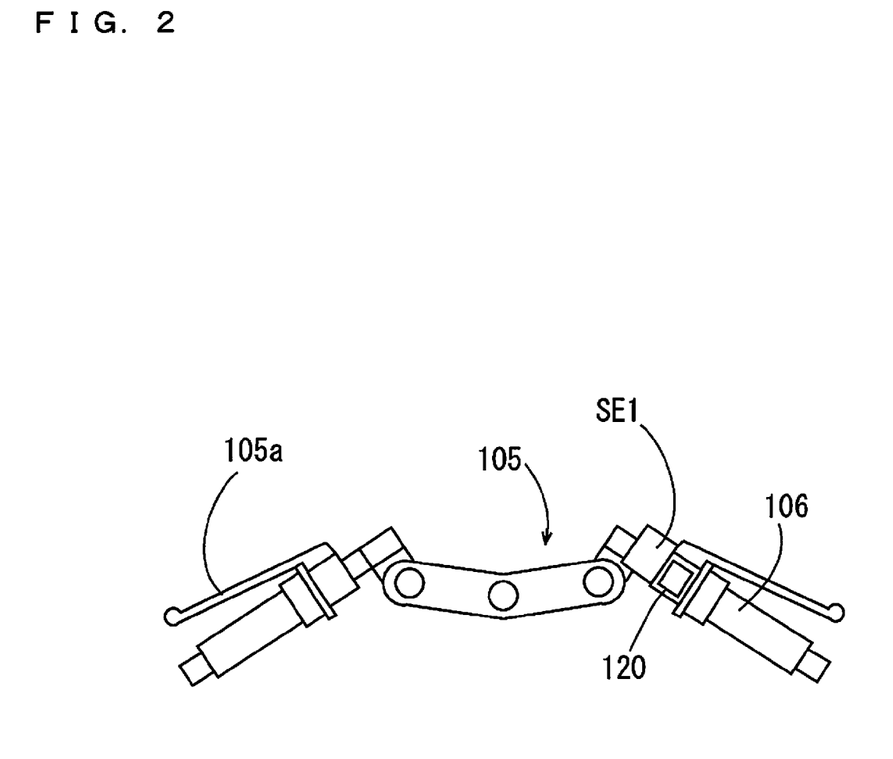
FIG. 2 is an upper view of a handle of the motorcycle.

FIG. 2 is a top view of the handle 105 of the motorcycle 100. A clutch lever 105a, an accelerator grip 106, an engine torque switch 120, and an accelerator opening sensor SE1 are provided on the handle 105. The accelerator opening sensor SE1 detects an operation amount of the accelerator grip 106 (hereinafter referred to as an accelerator opening) by a rider. The rider operates the engine torque switch 120 so that an amount of a target engine torque is selected. Details of the target engine torque will be described below.

As shown in FIG. 1, a vehicle speed sensor SE2 is provided on the front fork 103. The vehicle speed sensor SE2 detects a rotation speed of the front wheel 104. A steering angle sensor SE4 is provided in the vicinity of the head pipe 102 in the body frame 101. The steering angle sensor SE4 detects a steering angle. The steering angle refers to an angle defined by a center surface (a symmetry plane) of the front wheel 104 with respect to a front-to-rear direction of the body frame 101. The center surface of the front wheel 104 is equivalent to a moving direction of the motorcycle 100. For example, the steering angle is 0 degrees when the motorcycle 100 is travelling in a straight line, and the steering angle increases when the motorcycle 100 is turned to the left or right. The steering angle changes by the operation of the handle 105.

An engine 107 is provided at a center portion of the body frame 101. An intake pipe 108 and an exhaust pipe 109 are attached to the engine 107. A throttle device 60, described below (FIG. 4), is provided in the intake pipe 108. A transmission case 110 is provided behind the engine 107. A clutch 5, a transmission 6 (FIG. 3), and a gear ratio sensor SE3, described below, are provided in the transmission case 110. A shift pedal 210 is provided on the side of the transmission case 110.

Figure 3:
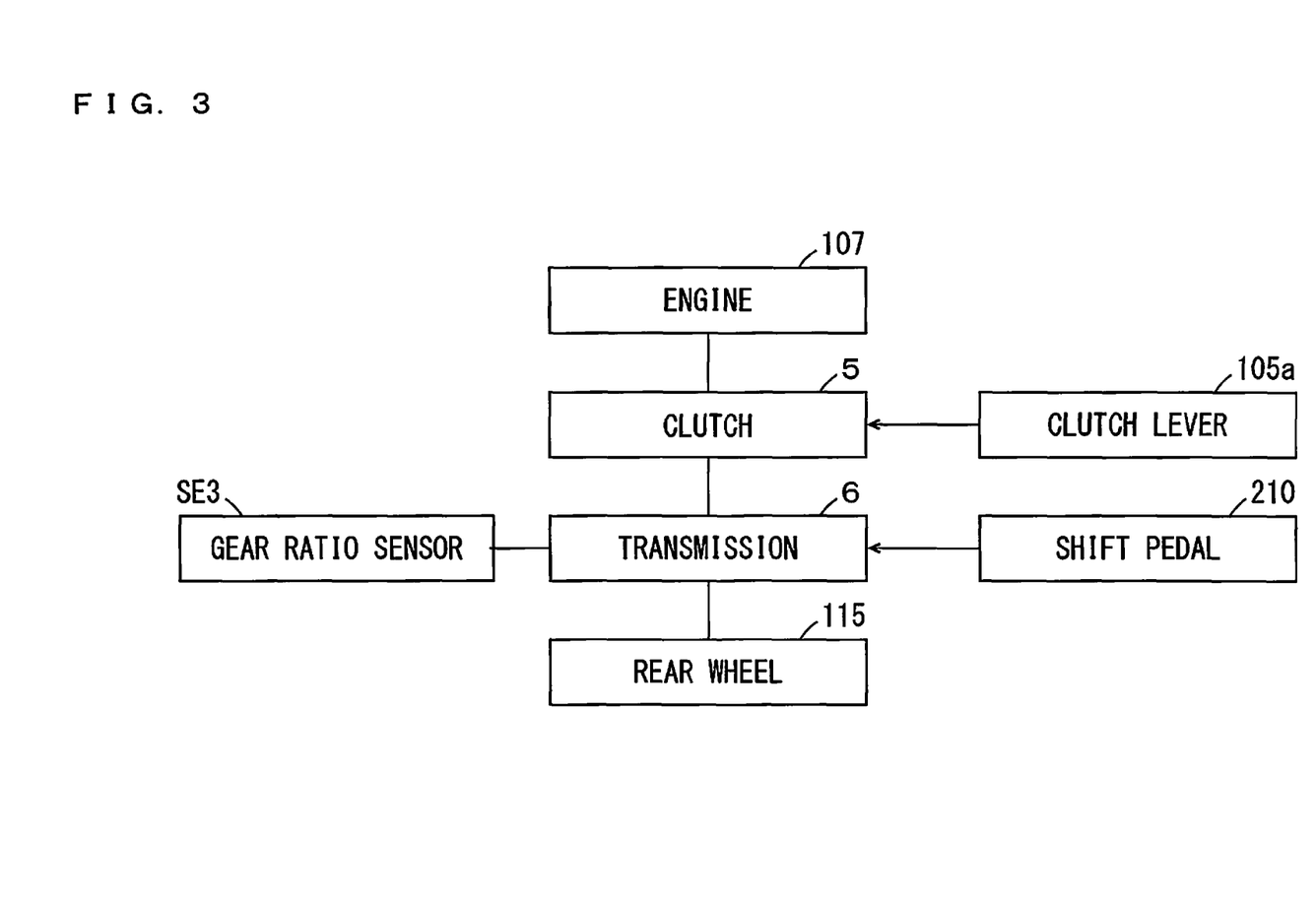
FIG. 3 is a block diagram for explaining a driving system of the motorcycle.

A rear arm 114 is arranged to extend rearward from the transmission case 110. A rear wheel 115 is attached to the rear end of the rear arm 114 so to be rotatable. A torque (rotational force) generated by the engine 107 is transmitted to the rear wheel 115 so that the rear wheel 115 is driven. A fuel tank 112 is arranged above the engine 107, and two seats 113 are provided behind the fuel tank 112 and arranged in the front-to-rear direction. A roll angle sensor SE5 and an ECU (Electronic Control Unit) 50 are provided below the seats 113. The roll angle sensor SE5 preferably is a gyro sensor, for example, and detects a roll angle of the motorcycle 100. The roll angle of the motorcycle 100 refers to an inclination angle of the motorcycle 100 with respect to a vertical direction. For example, the roll angle is 0 degrees when the motorcycle 100 is in an upright attitude, and the roll angle increases when the motorcycle 100 is turned to the left or right. Details of an ECU 50 will be described below.

FIG. 3 is a block diagram for explaining the driving system of the motorcycle 100. As shown in FIG. 3, the engine 107 is connected to the rear wheel 115 via the clutch 5 and the transmission 6. The rider operates the clutch lever 105a so that the clutch 5 is switched among a connected state, a disconnected state, and a semi-connected state (a half-clutch state).

The transmission 6 includes a plurality of transmission gears. The rider operates the shift pedal 210 so that a position of the transmission gear (hereinafter referred to as a gear position) changes and a gear ratio changes. The gear ratio refers to a ratio of a rotation speed of the engine 107 with respect to a rotation speed of the rear wheel 115. The gear ratio sensor SE3 detects the gear position. A CVT (Continuously Variable Transmission) defined by a pulley, a belt, and the like may be used as the transmission 6 instead of the plurality of transmission gears. In this case, the gear ratio sensor SE3 detects a position of the pulley, for example.

When the clutch 5 is in the connected state, a torque is transmitted between the engine 107 and the rear wheel 115. The torque generated by the engine 107 (hereinafter referred to as an engine torque) depends on the rotation speed of the engine 107 (hereinafter referred to as an engine rotation speed) and a throttle opening. During the deceleration of the motorcycle 100, when the engine torque becomes smaller than the torque of the rear wheel 115 due to inertia (hereinafter referred to as a rear wheel torque), rotational resistance of the engine 107 is exerted on the rear wheel 115 as a force in a direction of braking the rear wheel 115 (hereinafter referred to as an engine brake).

When the clutch 5 is in the disconnected state, a torque is not transmitted between the engine 107 and the rear wheel 115. When the clutch 5 is in the semi-connected state, a torque is partially transmitted between the engine 107 and the rear wheel 115.

Figure 4:
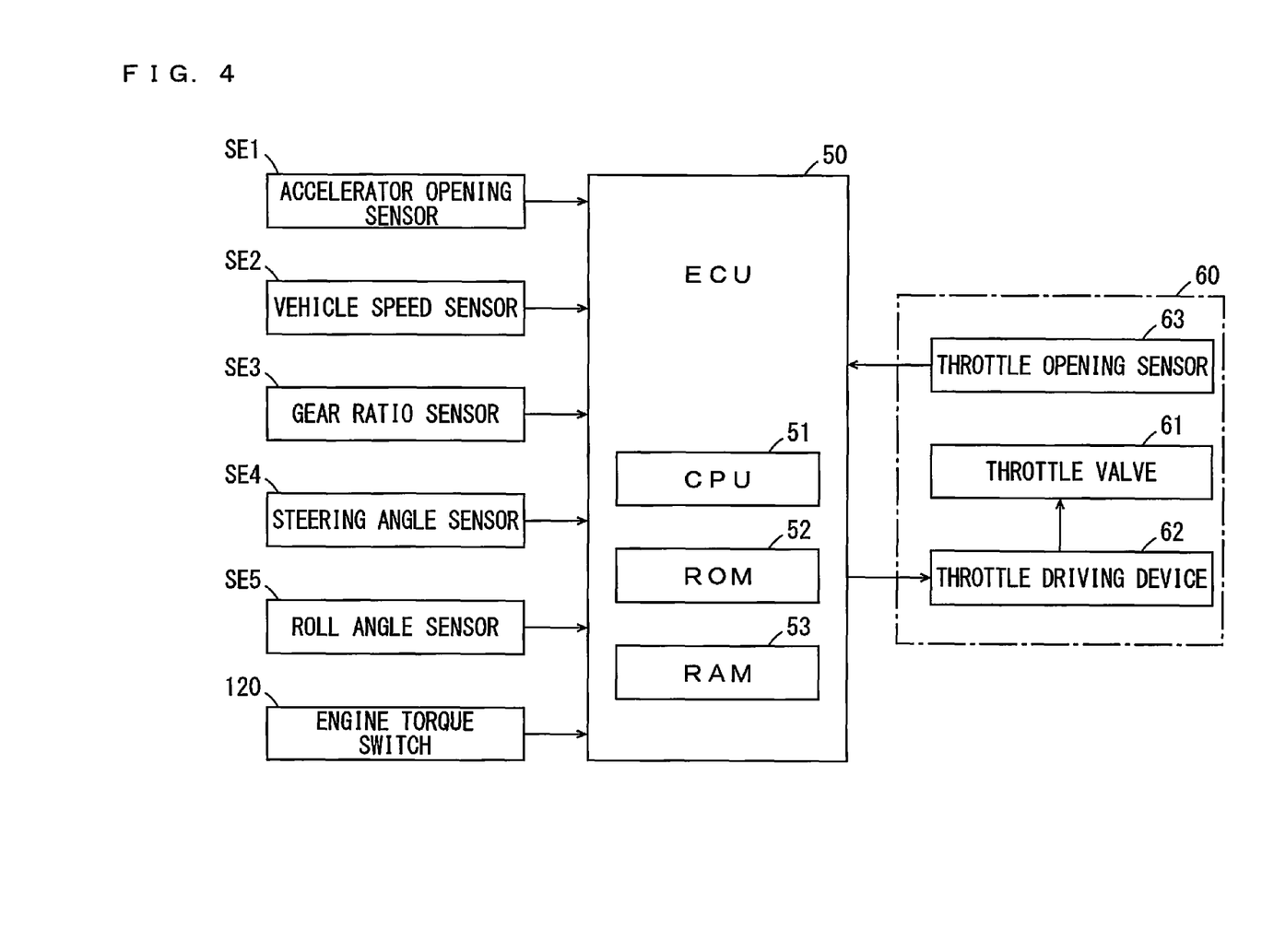
FIG. 4 is a block diagram for explaining a control system of the motorcycle.

FIG. 4 is a block diagram for explaining the control system of the motorcycle 100. As shown in FIG. 4, the ECU 50 includes a CPU (Central Processing Unit) 51, a ROM (Read On Memory) 52, and a RAM (Random Access Memory) 53. The detection results of the accelerator opening sensor SE1, the vehicle speed sensor SE2, the gear ratio sensor SE3, the steering angle sensor SE4, and the roll angle sensor SE5, and the operation content of the engine torque switch 120 by the rider are supplied to a CPU 51 of the ECU 50. In the present example, an intake amount control device is defined by the accelerator opening sensor SE1, the vehicle speed sensor SE2, the gear ratio sensor SE3, the steering angle sensor SE4, the roll angle sensor SE5, the engine torque switch 120, and the ECU 50.

The throttle device 60 includes a throttle valve 61, a throttle driving device 62, and a throttle opening sensor 63. A degree of opening of the throttle valve 61 (hereinafter referred to as a throttle opening) is adjusted by the throttle driving device 62, wherein an intake amount of the engine 107 is adjusted. The throttle opening is an example of a control parameter corresponding to the intake amount of the engine 107. The throttle driving device 62 is a motor, for example, and is controlled by the CPU 51 of the ECU 50. The throttle opening sensor 63 detects the throttle opening, and supplies the detection result to the CPU 51 of the ECU 50.

A control program is stored in a ROM 52 of the ECU 50. The CPU 51 performs the throttle opening adjustment process by executing the control program stored in the ROM 52 on a RAM 53. Further, a map that shows a relationship among the engine rotation speed, the engine torque, and the throttle opening, and various numerical values used for the throttle opening adjustment process and the like are stored in the ROM 52.

In the throttle opening adjustment process, a target throttle opening is calculated based on a hypothetical engine rotation speed and the target engine torque. Hereinafter, details of the hypothetical engine rotation speed, the target engine torque, and the throttle opening adjustment process will be described.

The CPU 51 of the ECU 50 (FIG. 4) calculates the hypothetical engine rotation speed based on a vehicle speed (a movement speed of the motorcycle 100), a length of an outer periphery of the rear wheel 115 (hereinafter referred to as a rear wheel peripheral length), and the gear ratio. The vehicle speed is calculated based on the rotation speed of the front wheel 104 detected by the vehicle speed sensor SE2. The rear wheel peripheral length is stored in advance in the ROM 52 of the ECU 50 (FIG. 3). The gear ratio is acquired based on the gear position detected by the gear ratio sensor SE3.

The hypothetical engine rotation speed is equivalent to the engine rotation speed on the assumption that the clutch 5 is in the connected state and slipping has not occurred between the rear wheel 115 and a ground surface. Specifically, the vehicle speed is divided by the rear wheel peripheral length such that the rotation speed of the rear wheel 115 is calculated. The calculated rotation speed of the rear wheel 115 is multiplied by the gear ratio such that the hypothetical engine rotation speed is calculated. Hereinafter, the actual engine rotation speed is referred to as an actual engine rotation speed. The actual engine rotation speed changes depending on the state of the clutch 5 and the presence or absence of slipping between the rear wheel 115 and the ground surface.

Figure 5:
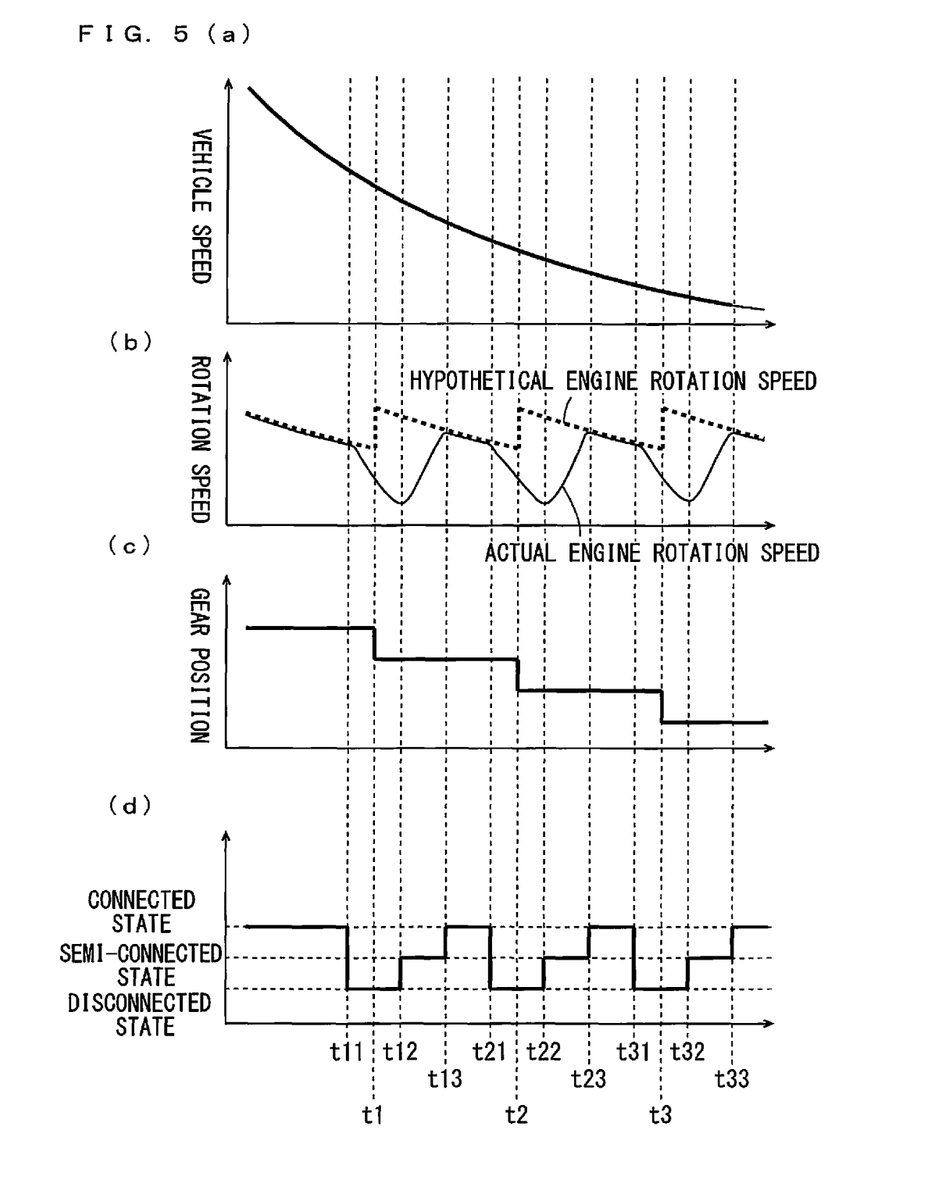

FIGS. 5(a)-(d) is a timing chart for explaining a relationship among the vehicle speed, the actual engine rotation speed, the hypothetical engine rotation speed, and the gear ratio. FIG. 5(a) shows the change of the vehicle speed, FIG. 5(b) shows the changes of the actual engine rotation speed and the hypothetical engine rotation speed, FIG. 5(c) shows the change of the gear position, and FIG. 5(d) shows the state of the clutch 5. In FIG. 5(b), the solid line indicates the actual engine rotation speed, and the dotted line indicates the hypothetical engine rotation speed. In the following description, lowering of the gear position means switching of the gear position such that the gear ratio increases.

In the example of FIGS. 5(a)-(d), the vehicle speed gradually decreases and the gear position is lowered in steps at time points t1, t2, t3. At the time of the switching of the gear position, the clutch 5 is temporarily kept in the disconnected state. Specifically, the clutch 5 is switched from the connected state to the disconnected state at a time point t11 that is before the time point t1. The clutch 5 is switched from the disconnected state to the semi-connected state at a time pint t12 that is after the time point t1. Thereafter, the clutch 5 is switched from the semi-connected state to the connected state at a time point t13. Similarly, the clutch 5 is switched to the disconnected state at a time point t21 that is before the time point t2, the clutch 5 is switched to the semi-connected state at a time point t22 that is after the time point t2, and the clutch 5 is switched to the connected state at a time point t23 that is after the time point t22. Further, the clutch 5 is switched to the disconnected state at a time point t31 that is before the time point t3, the clutch 5 is switched to the semi-connected state at a time point t32 that is after the time point t3, and the clutch 5 is switched to the connected state at a time point t33 that is after the time point t32.

The hypothetical engine rotation speed is not affected by the state of the clutch 5. When the gear position is constant, the hypothetical engine rotation speed decreases according to a decrease in the vehicle speed. When the gear position is lowered at the time points t1, t2, t3, the hypothetical engine rotation speed increases in steps.

The actual engine rotation speed is affected by the state of the clutch 5. In a case in which sliding has not occurred between the rear wheel 115 and the ground surface, the actual engine rotation speed is equal to the hypothetical engine rotation speed when the clutch 5 is in the connected state. In the example of FIGS. 5(a)-(d), sliding has not occurred between the rear wheel 115 and the ground surface. In a case in which sliding occurs between the rear wheel 115 and the ground surface during the deceleration of the motorcycle 100, the actual engine rotation speed becomes lower than the hypothetical engine rotation speed even if the clutch 5 is in the connected state. On the other hand, when the clutch 5 is in the disconnected state and when the clutch 5 is in the semi-connected state, the actual engine rotation speed becomes lower than the hypothetical engine rotation speed. This is because the engine torque becomes smaller than the rear wheel torque due to a decrease in the throttle opening.

Specifically, the clutch 5 is kept in the disconnected state in periods of the time points from t11 to t12, from t21 to t22, and from t31 to t32. In these periods, the actual engine rotation speed steeply decreases. The clutch 5 is kept in the semi-connected state in periods of the time points from t12 to t13, from t22 to t23, and from t32 to t33. In these periods, the clutch 5 proceeds from the disconnected state to the connected state. Therefore, the actual engine rotation speed increases to be close to the hypothetical engine rotation speed.

In this manner, the actual engine rotation speed largely changes by the operation of the clutch 5. If the throttle opening is adjusted based on the actual engine rotation speed, the throttle opening largely changes every time the rider operates the clutch 5, so that the engine torque is not stable. Therefore, in the present preferred embodiment, the throttle opening is adjusted based on the hypothetical engine rotation speed and not the actual engine rotation speed. Because the hypothetical engine rotation speed is not affected by the operation of the clutch 5, the throttle opening does not fluctuate due to the operation of the clutch 5 by the rider. Thus, the engine torque is stable.

Further, as described above, when the clutch 5 is in the disconnected state or the semi-disconnected state, the actual engine rotation speed is lower than the hypothetical engine rotation speed. Therefore, in a case in which the throttle opening is adjusted based on the actual engine rotation speed, the throttle opening may be adjusted to be excessively large when the clutch 5 is in the disconnected state or the semi-connected state. In this case, when the clutch 5 is switched to the connected state, the engine brake is excessively exerted. Therefore, the travelling of the motorcycle 100 becomes unstable due to sliding that occurs between the rear wheel 115 and the ground surface and the like.

On the contrary, in a case in which the throttle opening is adjusted based on the hypothetical engine rotation speed, the throttle opening is not adjusted to be excessively large even when the clutch 5 is in the disconnected state or the semi-connected state. Thus, when the clutch 5 is switched to the connected state, the engine brake is prevented from being excessively exerted so that the traveling of the motorcycle 110 is stable.

Further, the actual engine rotation speed is affected by the presence or absence of sliding, whereas the hypothetical engine rotation speed is not affected by the presence or absence of sliding. Therefore, even if sliding occurs between the rear wheel 115 and the ground surface, the throttle opening is adjusted based on the hypothetical engine rotation speed so that the engine torque is stable.

The CPU 51 of the ECU 50 (FIG. 4) calculates the target engine torque based on the operation of the engine torque switch 120 (FIG. 2) by the rider, the steering angle, the roll angle, and a friction coefficient between the rear wheel 115 and the ground surface (hereinafter referred to as a ground surface friction coefficient).

The steering angle and the roll angle are detected by the steering angle sensor SE4 and the roll angle sensor SE5. For example, a time period or a travelling distance from the time when the rotation of the front wheel 104 or the rear wheel 115 is stopped until the time when the travelling of the motorcycle 100 is stopped is detected at the time of braking the motorcycle 100, wherein the ground surface friction coefficient is calculated based on the detection result. Alternatively, a video image of the ground surface during travelling is captured by a camera and the acquired video image is analyzed, wherein the ground surface friction coefficient is acquired.

The target engine torque is a target value of the engine torque that is generated during the deceleration of the motorcycle 100. The engine torque switch 120 is configured to select one level of a plurality of levels that indicate a magnitude of the target engine torque. The rider selects a desired level according to a preference or the travelling conditions by operating the engine torque switch 120.

An initial value of the target engine torque is set in advance to correspond to each level. Each set initial value is stored in the ROM 52 of the ECU 50. The CPU 51 corrects the target engine torque by multiplying the initial value corresponding to the selected level by a gain corresponding to the steering angle, the roll angle, and the ground surface friction coefficient.

When the engine torque is small, the engine brake is large. When a large engine brake is exerted on the rear wheel 115, the rear wheel 115 is easily locked (stop of rotation). In a case in which the steering angle is large and a case in which the roll angle is large, the vehicle body becomes unstable due to the locking of the rear wheel 115. Further, when the ground surface friction coefficient is small, a large sliding is likely to occur between the rear wheel 115 and the ground surface due to the locking of the rear wheel 115.

Therefore, the initial value is multiplied by the gain corresponding to the steering angle such that the larger the steering angle is, the larger the target engine torque is. Similarly, the initial value is multiplied by the gain corresponding to the roll angle such that the larger the roll angle is, the larger the target engine torque is. Further, the initial value is multiplied by the gain corresponding to the ground surface friction coefficient such that the smaller the ground surface friction coefficient is, the larger the target engine torque is.

The target engine torque is preferably calculated by addition of a positive or negative correction value, corresponding to the steering angle, the roll angle, and the ground surface friction coefficient, to the initial value instead of multiplication of the initial value by the gain corresponding to the steering angle, the roll angle, and the ground surface friction coefficient.

Figure 6:
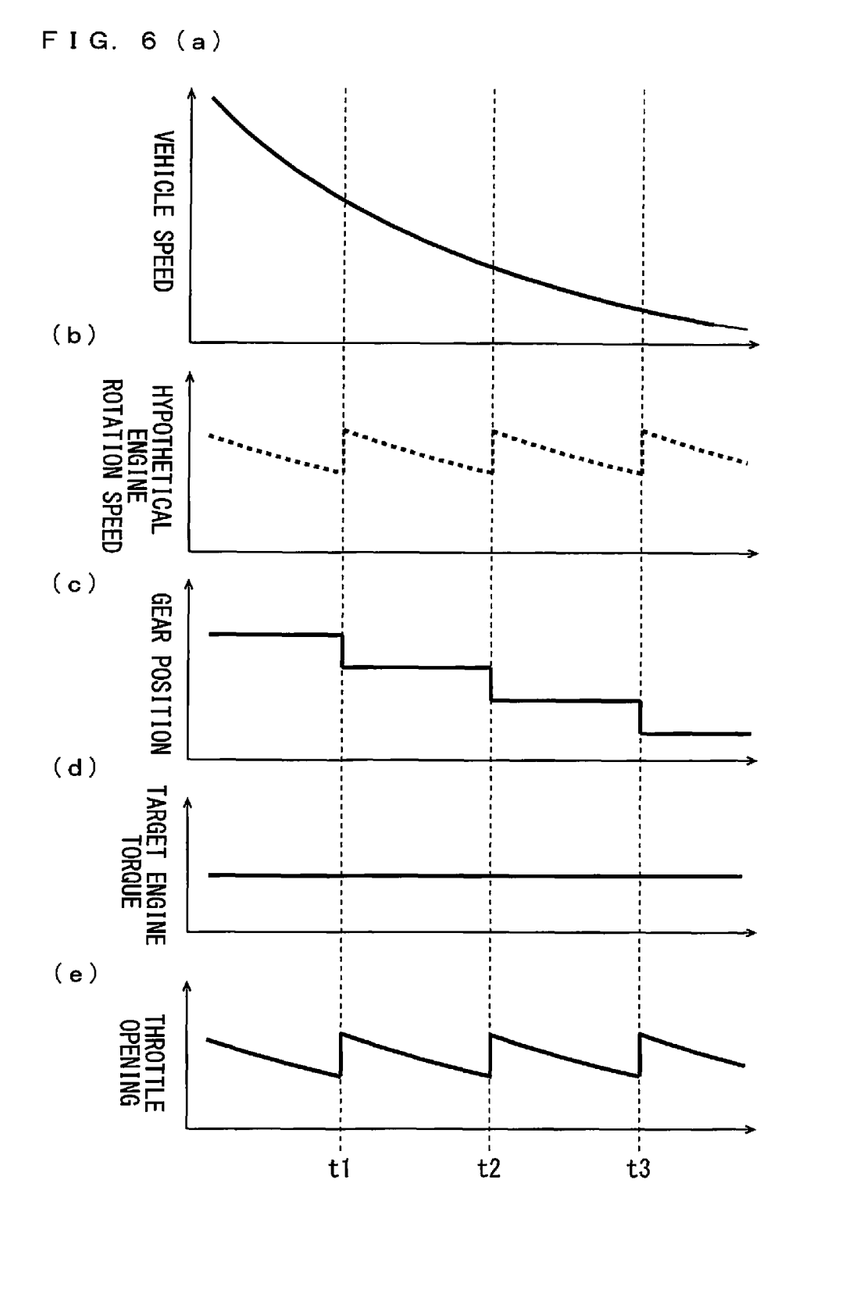

FIGS. 6(*a*)-(*e*) is a timing chart for explaining the relationship among the hypothetical engine rotation speed, the target engine torque, and the throttle opening. FIG. 6(*a*) shows the change of the vehicle speed, FIG. 6(*b*) shows the change of the hypothetical engine rotation speed, FIG. 6(*c*) shows the change of the gear position, FIG. 6(*d*) shows the change of the target engine torque, and FIG. 6(*e*) shows the change of the throttle opening. The changes of the vehicle speed, the hypothetical engine rotation speed, and the gear position in FIGS. 6(*a*)-(*c*) are preferably the same as the examples of FIGS. 5(*a*)-(*c*).

As shown in FIGS. 6(*a*)-(*e*), the target engine torque is kept at the calculated value. The throttle opening is adjusted based on the hypothetical engine rotation speed and the target engine torque. In this case, when the hypothetical engine rotation speed decreases, the throttle opening also decreases. Further, when the hypothetical engine rotation speed increases due to lowering of the gear position, the throttle opening also increases.

While the target engine torque is kept constant in the present example, preferred embodiments of the present invention are not limited to this. The target engine torque may dynamically change. For example, the target engine torque may be set in advance to gradually increase or decrease.

Figure 7:
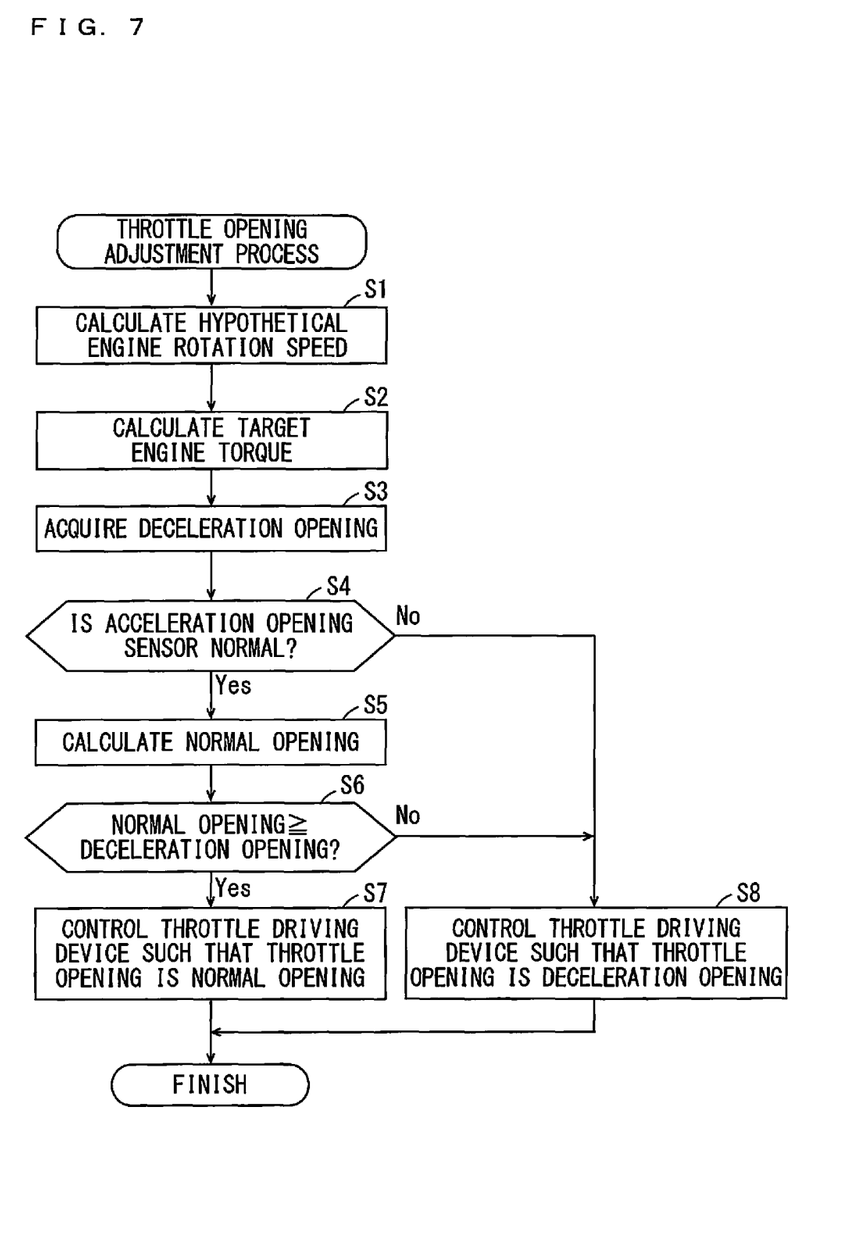
FIG. 7 is a flow chart of a throttle opening adjustment process.

FIG. 7 is a flow chart of the throttle opening adjustment process. The throttle opening adjustment process of FIG. 7 is repeatedly performed at a constant cycle during the travelling of the motorcycle 100, for example.

As shown in FIG. 7, the CPU 51 first calculates the hypothetical engine rotation speed based on the detection results of the vehicle speed sensor SE2 and the gear ratio sensor SE3, and the rear wheel peripheral length stored in the ROM 52 (step S1). Next, the CPU 51 calculates the target engine torque based on the operation content of the engine torque switch 120, the detection results of the steering angle sensor SE4, and the roll angle sensor SE5, and the acquired ground surface friction coefficient (step S2).

Next, the CPU 51 acquires the throttle opening corresponding to the hypothetical engine rotation speed calculated in step S1 and the target engine torque calculated in step S2 from the map stored in the ROM 52 as a deceleration opening (step S3). The deceleration opening is the throttle opening corresponding to the hypothetical engine rotation speed and the target engine torque.

A function indicating the relationship among the engine rotation speed, the engine torque, and the throttle opening may be stored in the ROM 52 instead of the map indicating the relationship among the engine rotation speed, the engine torque, and the throttle opening. In this case, the CPU 51 calculates the deceleration opening from the hypothetical engine rotation speed and the target engine torque using the function stored in the ROM 52.

Next, the CPU 51 determines whether or not the accelerator opening sensor SE1 is normal (step S4). For example, in a case in which the detection result is not output from the accelerator opening sensor SE1, or in a case in which the detection result of the accelerator opening sensor SE1 is not in a predetermined range, the CPU 51 determines that the accelerator opening sensor SE1 is not normal. On the other hand, in a case in which the detection results are continuously output from the accelerator opening sensor SE1 and the detection results are in the predetermined range, the CPU 51 determines that the accelerator opening sensor SE1 is normal.

When the accelerator opening sensor SE1 is normal, the CPU 51 calculates a normal opening based on the detection result of the accelerator opening sensor SE1 (step S5). The normal opening is the throttle opening corresponding to the accelerator opening.

Next, the CPU 51 determines whether or not the normal opening is not less than the deceleration opening (step S6). During the acceleration or the travelling at a constant speed of the motorcycle 100, the normal opening becomes not less than the deceleration opening. When the normal opening is not less than the deceleration opening, the CPU 51 controls the throttle driving device 62 such that the actual throttle opening is the normal opening calculated in step S5 (step S7), and terminates the process. In this case, the throttle opening is adjusted according to the operation amount of the accelerator grip 106 by the rider.

On the other hand, when the operation amount of the accelerator grip 106 decreases during the deceleration of the motorcycle 100, the normal opening becomes smaller than the deceleration opening. When the normal opening is smaller than the deceleration opening, the CPU 51 controls the throttle driving device 62 such that the actual throttle opening is the deceleration opening calculated in step S3 (step S8), and terminates the process. In this case, the throttle opening is adjusted such that the engine torque is the target engine torque calculated in step S2.

Further, in step S4, even when the accelerator opening sensor SE1 is not normal, the CPU 51 controls the throttle driving device 62 such that the actual throttle opening is the deceleration opening calculated in step S3 (step S8), and terminates the process.

When the accelerator opening sensor SE1 is determined to be not normal, an occurrence of a problem may be presented to the rider by a presentation device such as a buzzer or a lamp, and further, the motorcycle 100 may be automatically stopped by a braking device (a brake) that brakes at least one of the front wheel 104 and the rear wheel 105. In this case, the throttle opening is adjusted to the calculated deceleration opening in a period from the time when the accelerator opening sensor SE1 is determined to be not normal until the time when the motorcycle 100 is stopped. Thus, the motorcycle 100 is reliably stopped. Further, the throttle opening may be adjusted to a degree of opening set in advance such that suitable engine brake is exerted instead of being adjusted to the calculated deceleration opening.

In the motorcycle 100 according to the present preferred embodiment, the deceleration opening is calculated based on the hypothetical engine rotation speed and the target engine torque, and the throttle opening during the deceleration is adjusted to the calculated deceleration opening. In this case, because the hypothetical engine rotation speed is not affected by the state of the clutch 5, the throttle opening does not change by the operation of the clutch 5 by the rider. Thus, the engine brake is reliably controlled. Further, because the engine brake during the deceleration is reliably controlled using the existing throttle valve 61, the configuration of the motorcycle 100 is prevented from being complicated, so that an increase in cost is prevented.

Further, in the present preferred embodiment, the hypothetical engine rotation speed is calculated based on the rotation speed of the front wheel 104 detected by the vehicle speed sensor SE2, the gear ratio detected by the gear ratio sensor SE3, and the rear wheel peripheral length stored in advance. Thus, the hypothetical engine rotation speed is easily and accurately calculated.

Further, in the present preferred embodiment, the throttle opening corresponding to the hypothetical engine rotation speed and the target engine torque is acquired as the deceleration opening based on the map or the function that are stored in advance. Thus, the deceleration opening is easily acquired.

Further, in the present preferred embodiment, when the normal opening corresponding to the accelerator opening is smaller than the calculated deceleration opening, the throttle opening is adjusted to the deceleration opening, and when the normal opening corresponding to the accelerator opening is not less than the calculated deceleration opening, the throttle opening is adjusted to the normal opening. Thus, the throttle opening is appropriately controlled according to the operation of the operation element by the rider while the engine brake is prevented from being excessively exerted during the deceleration.

Further, in the present preferred embodiment, when the accelerator opening sensor SE1 is not normal, the throttle opening is adjusted to the deceleration opening. Thus, the throttle opening is prevented from being adjusted based on the detection result of the accelerator opening sensor SE1 with the accelerator opening sensor SE1 not being normal. Further, the throttle opening is adjusted to the deceleration opening so that the motorcycle 100 is automatically decelerated by the engine brake. As a result, the motorcycle 100 is prevented from making an unstable movement against the intention of the rider.

Further, in the present preferred embodiment, the magnitude of the target engine torque is adjusted based on the operation of the engine torque switch 120 by the rider. Thus, the magnitude of the engine brake is adjusted according to the preference of the rider and the driving conditions.

Further, in the present preferred embodiment, the target engine torque is corrected based on the steering angle, the roll angle, and the ground surface friction coefficient. Thus, the magnitude of the engine brake is controlled to be an appropriate magnitude corresponding to the traveling conditions.

While the vehicle speed (the movement speed of the motorcycle 100) is calculated by the CPU 51 based on the rotation speed of the front wheel 104 that is detected by the vehicle speed sensor SE2 in the above-described preferred embodiments, the vehicle speed may be acquired by another method. For example, the vehicle speed may be acquired using a GPS (Global Positioning System).

Further, the vehicle speed may be calculated based on the rotation speed of the rear wheel 115 instead of the rotation speed of the front wheel 104. When the rear wheel 115 is locked by the engine brake, however, the vehicle speed cannot be accurately calculated. Therefore, it is more preferable to calculate the vehicle speed using the rotation speed of the front wheel 104 than the rotation speed of the rear wheel 115 in order to acquire the accurate vehicle speed.

While the one level of the plurality of levels that indicates the magnitude of the target engine torque is selected by the operation of the engine torque switch 120 in the above-described preferred embodiments, the present invention is not limited to this. For example, the one level of the plurality of levels may be automatically selected based on the parameter such as the steering angle, the roll angle, and the ground surface friction coefficient. Alternatively, the target engine torque corresponding to the selected level is not used, but only the predetermined constant target engine torque may be used.

While the target engine torque is corrected based on the steering angle, the roll angle, and the ground surface friction coefficient in the above-described preferred embodiments, the present invention is not limited to this. The target engine torque may be corrected based on one or two of the steering angle, the roll angle, and the ground surface friction coefficient, for example. Alternatively, the initial value may be kept for use without the correction of the target engine torque. Alternatively, the target engine torque may be corrected based on another parameter such as temperature, humidity, or weight of the rider.

While a degree of opening of the throttle valve 61 provided in the intake pipe 108 is adjusted such that the intake amount of the engine 107 is adjusted during the deceleration in the above-described preferred embodiments, the present invention is not limited to this. For example, another intake path (a sub-intake path) configured to lead second air to the engine 107 and another valve configured to open and close the sub-intake path may be provided in addition to the intake pipe 108 and the throttle valve 61, and the intake amount of the engine 107 during the deceleration may be adjusted by the adjustment of a degree of opening of another valve.

In the above-described preferred embodiments, when the normal opening is smaller than the deceleration opening, the throttle opening is adjusted to the deceleration opening, and when the normal opening is not less than the deceleration opening, the throttle opening is controlled to be the normal opening, however, the present invention is not limited to this. For example, when the normal opening is smaller than the predetermined threshold value, the throttle opening may be adjusted to the deceleration opening, and when the normal opening is not less than the predetermined threshold value, the throttle opening may be controlled to be the normal opening. Further, in this case, the deceleration opening may be calculated only when the normal opening is smaller than the predetermined threshold value.

While the rear wheel 115 is the drive wheel driven by the engine 107 in the above-described preferred embodiments, the present invention is not limited to this. The front wheel 114 may be the drive wheel.

While the function of the controller is achieved by the CPU 51 of the ECU 50 and the control program in the above-described preferred embodiments, at least some of the functions of the controller may be achieved using hardware such as an electronic circuit.

While the above-described preferred embodiments are examples preferably applied to a motorcycle, the present invention can similarly be applied to another saddle-straddling type motor vehicle such as an ATV (All Terrain Vehicle), a motor three-wheeled vehicle, or a motor four-wheeled vehicle, for example.

In the following paragraphs, non-limiting examples of correspondence between various elements recited in the claims below and those described above with respect to various preferred embodiments of the present invention are explained.

In the above-described preferred embodiments, the motorcycle 100 is an example of a vehicle, the body frame 101 is an example of a main body, the engine 107 is an example of an engine, the rear wheel 115 is an example of a drive wheel, the clutch 5 is an example of a clutch, the degree of opening of the throttle valve 61 is an example of a control parameter, the intake pipe 108, the throttle valve 61, and the throttle driving device 62 are examples of the intake amount adjustor, the vehicle speed sensor SE2 is an example of a movement speed detector, the ECU 50 is an example of a controller and the deceleration opening is an example of a first value.

Further, the gear ratio sensor SE3 is an example of a gear ratio detector, the intake pipe 108 is an example of an intake path, the throttle valve 61 is an example of a throttle valve, the accelerator grip 106 is an example of an operation element, the accelerator opening sensor SE1 is an example of an operation amount detector, and the normal opening is an example of a second value. Further, the engine torque switch 120 is an example of an engine torque switch, the roll angle sensor SE5 is an example of a roll angle detector, the steering angle sensor SE4 is an example of a steering angle detector, the ECU 50 is an example of a friction coefficient acquirer, and the front wheel 104 is an example of a non-drive wheel.

As each of various elements recited in the claims, various other elements having configurations or functions described in the claims can be also used.

The preferred embodiments of the present invention may be effectively utilized on various types of vehicles.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:
1. A vehicle comprising:
a main body;
an engine that generates a torque to move the main body;
a drive wheel driven by the engine;
a clutch that switches between a connected state in which the torque is transmitted between the engine and the drive wheel, and a disconnected state in which the torque is not transmitted between the engine and the drive wheel;

an intake amount adjustor that adjusts an intake amount of the engine by changing a control parameter corresponding to the intake amount of the engine;

a movement speed detector that detects a movement speed of the main body; and a controller programmed or configured to, during deceleration of the vehicle and at least when the clutch is in the disconnected state:

calculate a hypothetical engine rotation speed, the hypothetical engine rotation speed being a rotation speed of the engine calculated based on the movement speed detected by the movement speed detector and an assumption that the clutch is in the connected state; and acquire a target value of the control parameter as a first value based on the hypothetical engine rotation speed and a set target engine torque, and to set the control parameter of the intake amount adjustor to the first value.

2. The vehicle according to claim 1, further comprising a gear ratio detector that detects a gear ratio between the engine and the drive wheel; wherein the controller is programmed or configured to calculate the hypothetical engine rotation speed based on the movement speed detected by the movement speed detector, the gear ratio detected by the gear ratio detector, and a peripheral length of the drive wheel.

3. The vehicle according to claim 1, wherein the controller is programmed or configured to store in advance a relationship among the torque generated by the engine, the rotation speed of the engine, and the control parameter, and to acquire a value of the control parameter corresponding to the hypothetical engine rotation speed and the set target engine torque as the first value based on the stored relationship.

4. The vehicle according to claim 1, wherein the intake amount adjustor includes at least one intake path that leads air to the engine and at least one valve provided in the at least one intake path, and the control parameter includes a degree of opening of the at least one valve.

5. The vehicle according to claim 4, wherein the at least one valve is a throttle valve, and the degree of opening of the at least one valve is a degree of opening of the throttle valve.

6. The vehicle according to claim 1, further comprising:

an operation element operated by a rider in order to adjust the control parameter corresponding to the intake amount of the engine; and an operation amount detector that detects an operation amount of the operation element by the rider; wherein the controller is programmed or configured to acquire a value of the control parameter corresponding to the operation amount detected by the operation amount detector as a second value, to set the control parameter of the intake amount adjustor to the first value when the acquired second value is smaller than the acquired first value, and to set the control parameter of the intake amount adjustor to the second value when the acquired second value is not less than the acquired first value.

7. The vehicle according to claim 6, wherein the controller is programmed or configured to determine whether or not the operation amount detector is normal, and to set the control parameter of the intake amount adjustor to the first value when the operation amount detector is not normal.

8. The vehicle according to claim 1, wherein a plurality of values are set in advance as the target engine torque; and the vehicle further comprises an engine torque switch that is operated by a rider in order to select one value of the plurality of values.

9. The vehicle according to claim 1, further comprising a roll angle detector that detects a roll angle of the main body, wherein the controller is programmed or configured to correct the set target engine torque based on the roll angle detected by the roll angle detector, and to acquire the first value based on the corrected target engine torque.

10. The vehicle according to claim 1, further comprising a steering angle detector that detects a steering angle defined by a moving direction of the main body with respect to a front-to-rear direction of the main body, wherein the controller is programmed or configured to correct the set target engine torque based on the steering angle detected by the steering angle detector and to acquire the first value based on the corrected target engine torque.

11. The vehicle according to claim 1, further comprising a friction coefficient acquirer that acquires a friction coefficient between the drive wheel and a ground surface, wherein the controller is programmed or configured to correct the set target engine torque based on the friction coefficient acquired by the friction coefficient acquirer and to acquire the first value based on the corrected target engine torque.

12. The vehicle according to claim 1, further comprising a plurality of wheels that include at least the drive wheel, wherein the movement speed detector detects the movement speed of the main body based on a rotation speed of at least one wheel of the plurality of wheels.

13. The vehicle according to claim 12, wherein the plurality of wheels include a non-drive wheel that is not driven by the engine, and the movement speed detector detects the movement speed of the main body based on a rotation speed of the non-drive wheel.

14. The vehicle according to claim 12, wherein the plurality of wheels include a front wheel and a rear wheel, and the movement speed detector detects the movement speed of the main body based on a rotation speed of the front wheel.

15. An intake amount control device for controlling an intake amount of an engine on a vehicle including the engine, a clutch, and an intake amount adjustor, the intake amount adjustor adjusts an intake amount of the engine by changing a control parameter corresponding to the intake amount of the engine, the intake amount control device comprising:

a movement speed detector that detects a movement speed of the vehicle; and a controller programmed or configured to, during deceleration of the vehicle and at least when the clutch is in a disconnected state:

calculate a hypothetical engine rotation speed, the hypothetical engine rotation speed being a rotation speed of the engine based on the movement speed detected by the movement speed detector and an assumption that the clutch is in the connected state; and acquire a target value of a control parameter as a first value based on the hypothetical engine rotation speed and a set target engine torque, and to set a control parameter of the intake amount adjustor to the first value.

* * * * *